UNITED STATES PATENT OFFICE.

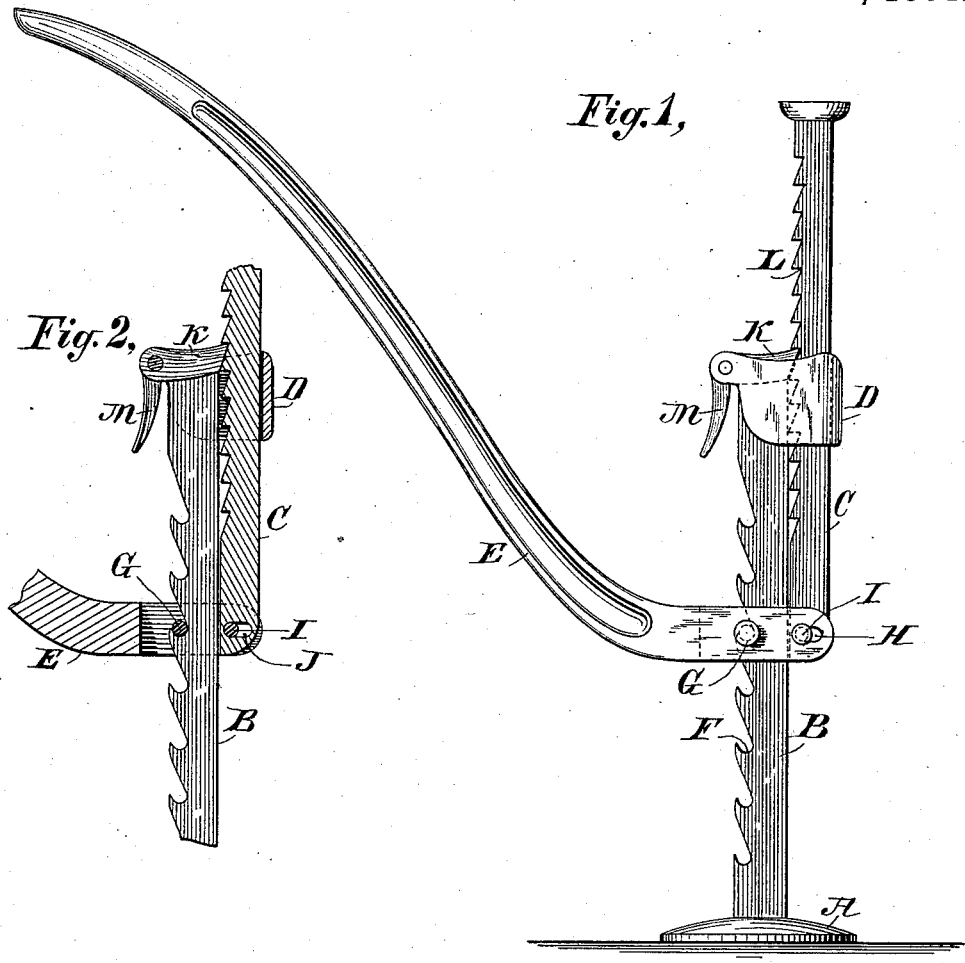

WILLIAM JOEL BUTLER, OF SALINAS, CALIFORNIA.

LIFTING-JACK.

SPECIFICATION forming part of Letters Patent No. 307,376, dated October 28, 1884.

Application filed August 29, 1884. (No model.)

*To all whom it may concern:*

Be it known that I, WILLIAM J. BUTLER, of Salinas, in the county of Monterey and State of California, have invented certain new and useful Improvements in Lifting-Jacks, of which the following is a full, clear, and exact description, and will enable others to make and use the same.

The drawings accompanying this specification represent, in Figure 1, a side or elevation view of a jack embodying my improvements, while Fig. 2 shows the overlying portions of the same cut away in order to expose the parts below.

This invention relates to that kind of lifting-jacks that consist, in general, of an upright bar or standard rising from a suitable base, a parallel lifting-bar attached to said standard so as to be movable thereon, and lever-connections between the standard and the lifting-bar, whereby said bar is actuated.

The present invention consists in the improved construction and arrangement of these parts, whereby the implement as a whole is cheaply produced, its various parts easily combined or replaced, and its operation made much more effective than is the case with the common forms of this kind of lifting-jacks.

The various features of the improved mechanism will be more fully pointed out in the following description.

Referring to the drawings in detail, A represents the base of the jack; B, the standard rising therefrom, and C the lifting-bar, which moves vertically along said standard, being held thereto by the strap D, which also serves as a guide for the lifting-bar, E being the lifting-lever which operates to raise the lifting-bar. The standard is provided with circular notches F, into which the fulcrum-pin G of the lever takes. This lever is forked, so as to pass on both sides of the standard, and its forked end is provided with slots H, in which moves the roller-pin I, which roller-pin also passes freely through a slot, J, cut laterally in the lower end of the lifting-bar. This pin is properly headed to keep it in place in the slots; but it is free to move in either of or both of the slots H and J, and it thus forms a loose joint, connecting the lever and lifting-bar.

K is a dog pivoted between the ends of the strap D, and resting upon the upper end of the standard. This dog engages the teeth L on the lifting-bar, and thereby serves to hold the bar at any elevated position to which it may be raised. This dog has a thumb-piece, M, by which it is raised when it is desired to permit the lifting-bar to descend.

The action of the jack is this: When it has been put in proper position to lift any object, and the upper end of its lifting-bar brought to bear against the object to be lifted, the lifting-lever is swung to a position where its fulcrum-pin will rest in that one of the circular notches F then next above the lower end of the lifting-bar, the slots H and J allowing sufficient lengthwise movement of the lever for it to pass over said notches. The lever is now depressed and the lifting-bar is moved vertically to a distance corresponding to the extent of the swing of the handle of the lever, the dog K dropping behind the catches on the lifting-bar and retaining it. During this upward movement of the lifting-bar the shorter arm of the lever has of course been shortened, which is permitted by the roller-pin moving in the slots in the lever and lifting-bar. After the lifting-bar has been raised one step, or by the depression of the lever once, the lever is again swung to a new fulcrum-point and the bar lifted through another step, the lever thus following the bar up the standard to whatever height it may be raised.

It will be seen that the parts composing this jack are all very simple in construction and readily assembled or taken apart, it only requiring the removal of the roller-pin to free the lever and lifting-bar from the standard; and this loose joint or rolling connection between the lever and lifting-bar is the most important feature of improvement, for it best gives the lever its movable capacity lengthwise and permits the necessary variation in length of its shorter arm with the least possible friction, and all by the simplest and cheapest forms of structure.

The slots in the lever and lifting-bar may, it is plain, be constructed so that but one slot for the rolling-pin will be necessary; but I prefer to have the slots arranged as shown, as best effecting the end for which they are designed.

What is claimed as new is—

1. The combination, in the herein-described lifting-jack, of the notched standard, the lifting-bar moving thereon, and the lever adapted to engage with the fulcrum-notches on the standard, and connected with the lifting-bar by the rolling-pin moving in slots suitably arranged in said lever or lifting-bar, or both, all substantially as shown and herein set forth.

2. The combination, in the herein-described lifting-jack, of the notched standard bearing the retaining-dog, the toothed lifting-bar moving thereon, and the lever adapted to engage with the fulcrum-notches on the standard, and connected with the lifting-bar by the means set forth, all substantially as shown and described.

WILLIAM JOEL BUTLER.

Witnesses:
W. P. NICHOLS,
WM. KELLOGG.